July 12, 1932.  J. SLEPIAN  1,866,679

DIRECT CURRENT SUPPLY SYSTEM

Filed March 31, 1926  2 Sheets-Sheet 1

WITNESSES:
Wm. C. Groome
S. M. Trueles

INVENTOR
Joseph Slepian.
BY Wesley G. Carr
ATTORNEY

Patented July 12, 1932

1,866,679

UNITED STATES PATENT OFFICE

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA

DIRECT CURRENT SUPPLY SYSTEM

Application filed March 31, 1926. Serial No. 98,853.

My invention relates to direct-current supply systems, and has, among its objects the provision of improved means for smoothing out the voltage pulsations of direct-current supply sources.

A more particular object of my invention is to provide improved means for smoothing out the voltage pulsations of rectified alternating currents for supplying electron tubes of high-frequency transmitting and receiving apparatus, or the like.

With the advent of three-electrode tubes for the reception and transmission of speech, it became increasingly important to provide convenient means for deriving a smooth substantially non-pulsating direct current for energizing such tubes. Accordingly, filter circuits have been designed for reducing the magnitude of the ripples which are ordinarily present in the commercially available sources of direct-current energy, such as commutator-type dynamo-electric machines or alternating-current rectifiers, the filter circuits consisting of suitably combined condenser and reactance elements. Depending upon the degree to which the direct-current ripples must be smoothed out, more or less of the filter-circuit elements must be used. The cost and space requirements of the filters are in most cases, very objectionable.

According to my present invention, I reduce the magnitude of the ripples in the voltage applied to the load by connecting a space-current device in series with the source of unidirectional pulsating current which is provided with a grid arranged to so vary the impedance or the discharge conditions of the tube as to offset the influence of the pulsations. More particularly, the potential of the grid is so controlled with respect to the cathode of the space-current device that the impedance of the conducting path through the device is increased when the voltage of the source increases above the value at which the voltage across the load is desired to be maintained.

In the preferred embodiment of my invention I provide the rectifiers which are used for converting alternating current into direct current with control electrodes in the form of grids, or the like, and so control the potential of said electrodes as to increase the impedance of the rectifying path in response to an increase in the rectified voltage above the desired value of that voltage, thus greatly reducing the magnitude of the voltage pulsations at the terminals of the load.

Figure 1:
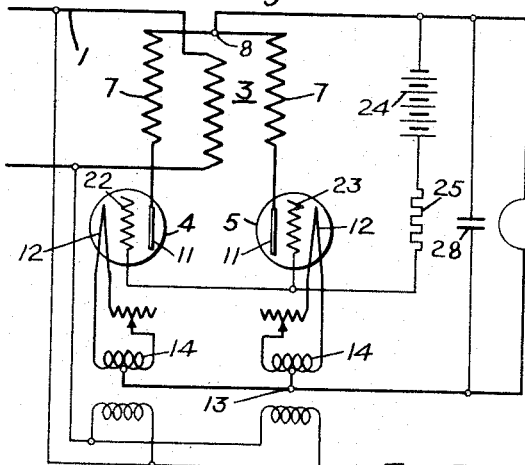
Figure 2:
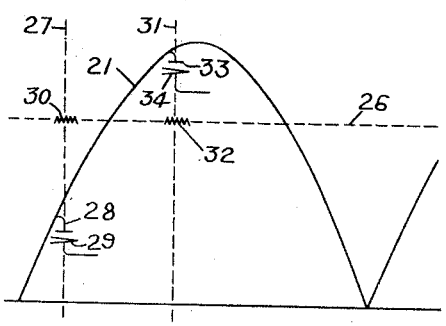
Figure 3:
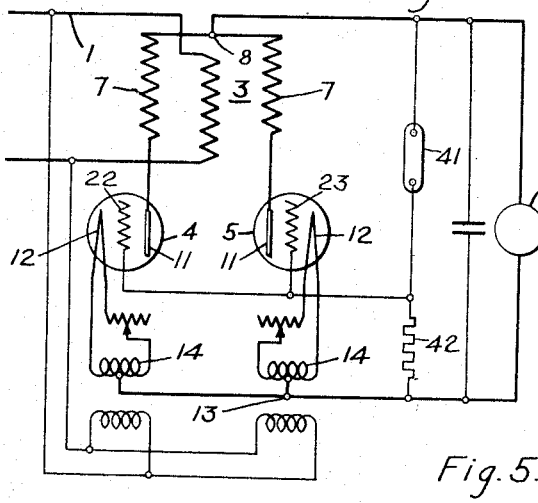
Figure 4:
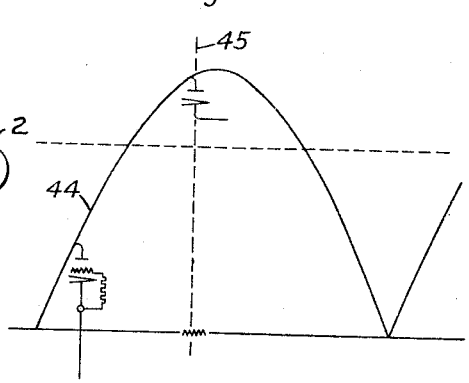
Figure 5:
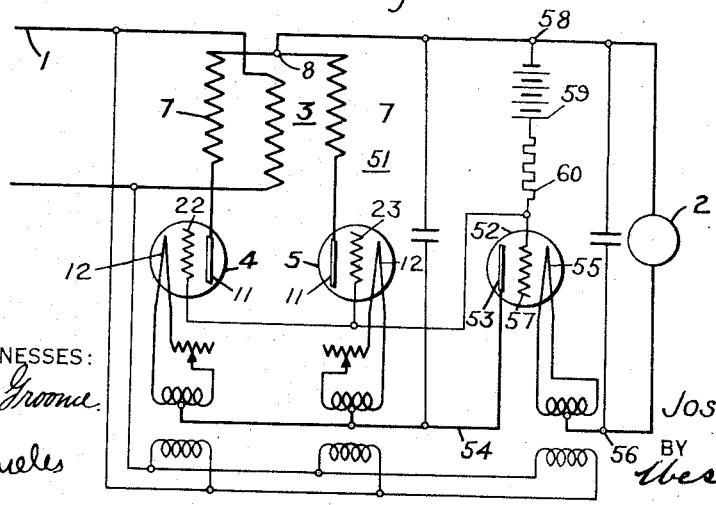
Figure 6:
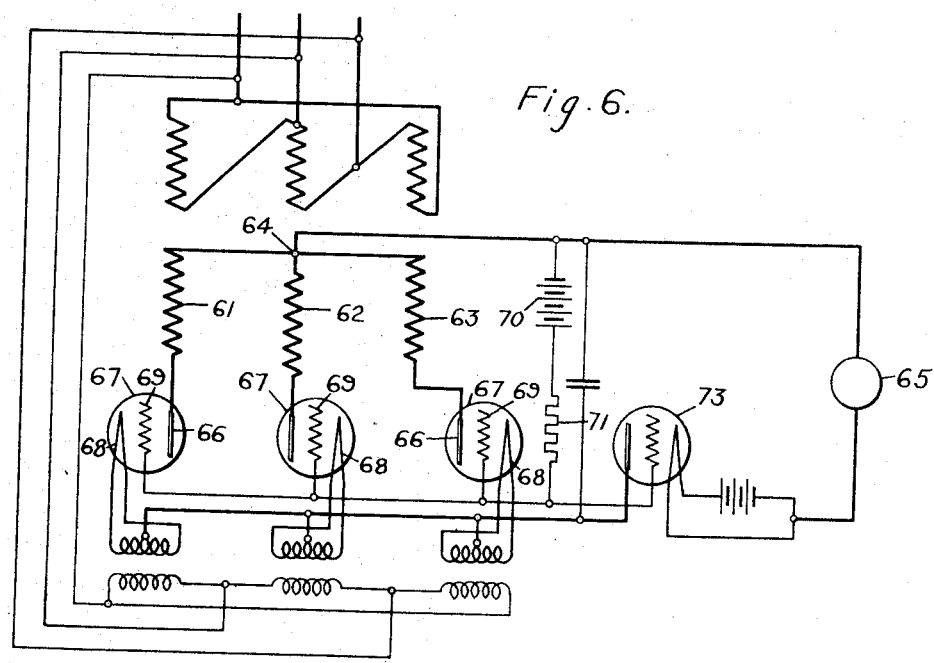

The foregoing and other objects of my invention will be best understood by reference to the accompanying drawings, wherein Figure 1 is a diagrammatic view of a double-wave rectifying system embodying my invention, Fig. 2 is a curve diagram illustrating the voltage relations between the electrodes of the rectifiers utilized in the rectifying system shown in Fig. 1, Figs. 3 and 4 are diagrammatic views similar to Figs. 1 and 2, respectively, of a modification of my invention, Figs. 5 and 6 are diagrammatic views similar to Fig. 1, illustrating further modifications of my invention.

Referring to Fig. 1, alternating current from a supply line 1 is converted into direct current that is to be supplied to a load 2, such as a vacuum-tube receiving or generating system, by means of a transformer 3 and a pair of space-current rectifiers 4 and 5. The transformer has a two-coil secondary winding 7, the neutral terminal 8 of which constitutes the negative direct-current terminal. The free end terminals of the transformer winding 7 are connected to anodes 11 of the rectifiers 4 and 5, the cathodes 12 of the rectifiers being connected together at 13 to constitute the positive direct-current terminal.

The rectifiers are shown to be of the hot-cathode type, in which rectification is obtained by maintaining the cathode 12 at incandescence by current from suitable heating transformer windings 14.

If no further means were provided for smoothing out the ripples of the rectified current, the rectified voltage wave would consist of a series of sine-wave halves, as indicated in curve 21 of Fig. 2. The magnitude of the voltage applied to the load would then vary between a maximum, corresponding to the peak voltage in a phase of a transformer winding 7, and zero. In order to materially reduce the magnitude of the pulsations of the rectified voltage wave without excessive use of filter circuits, I provide the rectifiers 4 and 5 with control electrodes 22, 23, in the form of grids or the like, and apply to the grids a suitable potential to so vary the conductivity of the rectifier paths as to offset the undesirable effect of the voltage pulsations and reduce the ripples in the direct current supplied to the load.

Various methods may be utilized for effecting the grid control in accordance with my invention. In the rectifying system shown in Fig. 1, the two grids are connected together and maintained at a definite positive potential with respect to the negative direct-current terminal 8 by means of an auxiliary source of direct-current potential, such as a biasing battery 24, and a current limiting impedance device or resistor 25 connected between the grids and one terminal of the battery. If the voltage of the battery 24 is so chosen that it is approximately equal to the value of the desired direct-current voltage, the grid will be positive with respect to the cathodes of the rectifiers 4 and 5 during the periods of the alternations when the rectified voltage wave is below the desired value, and it will be at a negative potential with respect to the cathodes during the periods of the alternations when the rectified voltage wave is higher than the desired value, as shown in Fig. 2, wherein the horizontal broken line 26 indicates the desired value of the rectified voltage. At a moment corresponding to the vertical broken line 27, when the rectified voltage has a value less than the desired direct-current voltage, the potentials of the anode and cathode of the rectifier, which is conductive at that instant, may be represented symbolically by marks 28, 29 respectively, in Fig. 2, the potential of the grid being shown symbolically by a mark 30. Under these conditions the grid is at a positive potential with respect to the cathode, accelerating the flow of electrons from the cathode and materially reducing the impedance and the voltage drop in the rectifying path.

At another moment of the rectifying cycle, corresponding to the line 31 in Fig. 2, the potentials of the grid, anode and cathode of the rectifier will be as indicated by the marks 32, 33 and 34, respectively, the rectified voltage being higher than the value of the desired direct-current voltage and the potential of the grid being negative with respect to the cathode, increasing the space-charge effect and consequently increasing the impedance and the voltage drop in the tube in such manner as to compensate for the increased value of the rectified voltage.

The magnitude of the control voltage applied to the grid may be varied, depending upon the shape of the rectified voltage wave and upon the amplifying constants of the space-current devices 4 and 5. By suitably adjusting the various constants of the circuit, a surprisingly large decrease in the voltage pulsations will be obtained. Very good results are secured by making the voltage of the battery 24 approximately equal to the voltage of the direct-current that is to be applied to the load. A condenser 28 is also shown connected across the direct-current terminals 8 and 13 for further reducing the voltage pulsations.

In the modification of my invention shown in Fig. 3, I secure the desired control of the potential of the grids 22, 23 without the use of an auxiliary battery by connecting an auxiliary impedance device, such as a gas-filled discharge tube 41, between the negative direct-current terminal 8 and the grids 22, 23, such device being so constituted as to provide an open circuit when the voltage across the tube is below a predetermined value and to bridge the open-circuit gap when the voltage thereacross exceeds said value. An auxiliary high-resistance leakage element 42 is also connected between the positive direct-current terminal 13 and the grids.

In the system shown in Fig. 3, if the breakdown voltage of the auxiliary impedance device or tube 41 is made approximately equal to the value of the desired direct-current voltage, the tube will provide an open circuit as long as the rectified voltage wave is below said value, the grids being then maintained at the potential of the associated cathodes through the leakage resistor 42, as indicated symbolically at 44, in Fig. 4. When the rectified voltage rises above the desired value, the auxiliary tube 41 breaks down and the grids acquire the potential of the negative direct-current terminal 8, thus being negative with respect to the cathode and, as a result thereof, the space-charge effect of the tube and the voltage drop in the same is increased, as in the rectifier system shown in Fig. 1. The potentials of the grid, the anode and the cathode of the rectifier under the latter conditions are indicated symbolically at 45, in Fig. 4.

The idea underlying the means for reducing the voltage pulsations in connection with the rectification of alternating current may also be embodied in apparatus which is independent of the source from which the pulsating or non-uniform direct current is derived, by utilizing a series-connected space-current device, the impedance of which is controlled to compensate for the variations in the uniformity of the voltage of the source.

Thus, in order to further reduce the voltage pulsations of a source of pulsating unidirectional voltage, such source being shown, in Fig. 5, as a double-wave rectifying system 51 similar to that shown in Fig. 1, I provide a series-connected space-current device 52 having an anode 53 connected to the positive lead 54 of the source 51 and a cathode 55 leading to the positive terminal 56 of the load 2. The space-current device 52 is provided with a control electrode 57 which is maintained at a predetermined positive potential with respect to the negative direct-current terminal 58 by means of an auxiliary grid biasing battery 59 associated with a current-limiting resistor 60. The grid biasing means may, or may not, be associated with the grids 22 and 23 of the rectifiers in the rectifying system 51. The action of the control electrode 57 of the series-connected tube 52 is in every respect similar to that of the grids 22 and 23 in the rectifiers 4 and 5, the impedance of the tube 52 being increased when the voltage of the source is more than the desired value, and vice versa.

In Fig. 6, my invention is shown as applied to a three-phase rectifying system. The three-phase secondary windings 61, 62 and 63 of a supply transformer have a common neutral connection 64 constituting the negative direct-current terminal, and the free terminals of the three phase windings 61 to 63 are connected to the anodes 66 of three hot-cathode rectifiers 67, the cathodes 68 of which are interconnected and constitute the positive direct-current terminal. The rectifiers are further provided with control electrodes or grids 69 which are connected together and maintained at a predetermined potential with respect to the negative terminal of the load by means of an auxiliary battery 70 and a current-limiting resistor 71. The system is similar to that shown in Fig. 1. If desired, a series-connected variable-impedance tube 73 may be utilized in the direct-current leads, as shown in Figs. 5 and 6.

The details of the means for controlling the potential of the electrodes which vary the impedance of the space-current devices to compensate for undulations of the direct-current voltages may be varied in many respects and a variety of other arrangements may be devised in accordance with the underlying principles of my invention disclosed hereinabove, and I desire the term "grid", in the claims, to be so construed. I desire also that the expressions, "a plurality of rectifiers", "a plurality of space-current devices," and other similar expressions in the appended claims shall be construed to cover either separate rectifiers, or several rectifiers combined in one unit and having common electrodes, such as mercury-arc rectifiers.

I claim as my invention:

1. In a system for supplying a unidirectional, substantially smooth current, the combination of a space-current rectifying device comprising a hot cathode and an anode, a source of alternating current having a terminal connected to said anode, means for connecting the negative terminal of a direct-current load to the other terminal of said source and for connecting the positive terminal of said load to said cathode, a space-current control electrode for said rectifying device and means for maintaining said control electrode at a predetermined constant potential with respect to the negative terminal of said load.

2. In a system for supplying a unidirectional, substantially smooth voltage, the combination of a space-current rectifying device comprising a hot cathode and an anode, a source of alternating current having a terminal connected to said anode, means for connecting the negative terminal of a direct-current load to the other terminal of said source and for connecting the positive terminal of said load to said cathode, a space-current control electrode for said rectifying device, said control electrode being maintained at substantially constant potential with respect to the negative terminal of said load, said constant potential being approximately equal to the desired value of the rectified voltage.

3. In a system for supplying a unidirectional substantially smooth current, the combination of a plurality of transformer windings having induced therein voltages of different phases, said windings being interconnected in star to provide a negative direct-current terminal, a space-current rectifier for each winding, each rectifier comprising an anode and a cathode, the anodes being connected to the free terminals of the respective windings, the cathodes of the several rectifiers being interconnected to provide a positive direct-current terminal, a space-current control-electrode for each rectifier, and means for maintaining said control electrodes at a predetermined potential with respect to the star connection of said windings.

4. In a system for supplying a unidirectional, substantially smooth voltage, the combination of a plurality of windings having induced therein voltages of different phases, said windings being interconnected in star to provide the negative direct-current terminal, a space-current rectifier for each winding, each rectifier comprising an anode and a cathode, the anodes being connected to the free terminals of the respective windings, the cathodes of the several rectifiers being interconnected to provide the positive direct-current terminal, a space-current control-electrode for each rectifier, and means for maintaining said control electrode at a predetermined potential difference with respect to the star connection of said windings, said potential difference being substantially equal to the desired value of the rectified voltage.

5. The combination with a source of alternating-voltages having two terminals, a space-current rectifying device having an anode, a cathode and a grid, said rectifying device being of a type producing an increased internal voltage drop when the grid is negative with respect to the cathode, the anode of said rectifying device being connected to one terminal of said source, a direct-current load device connected between said cathode and the other terminal of said source, control means for maintaining a direct-current potential substantially equal to the mean potential impressed upon said load device, and a connecting circuit including said control means joining said grid and the connections between the second-mentioned terminal of said source and said load device.

6. The combination with a source of alternating-voltages having two terminals, a space-current rectifying device having an anode, a cathode and a grid, said rectifying device being of a type producing an increased internal voltage drop when the grid is negative with respect to the cathode, the anode of said rectifying device being connected to one terminal of said source, a direct-current load device connected between said cathode and the other terminal of said source, and means directly connected to the negative terminal of said load device for rendering said grid negative during and only during, the peak portions of the alternating voltage wave of said source.

7. The combination with an alternating-current source, a rectifying space-current device and a direct-current load connected in operative relation, the space-current device being of a type having an anode, a cathode and a grid susceptible of increasing the internal impedance of the device when it is negative with respect to the cathode, of a fixed resistor and a variable-resistance device connected in shunt across the load, and a connection between the grid and the common terminal of said fixed and variable resistors, the connections being such and said variable-resistance device being of such nature as to inherently operate to render said grid negative with respect to said cathode only whenever excessive rectified potentials are impressed upon said load.

8. The combination with a source of variable potential and a direct-current load supplied thereby, of a space-current device having an anode, a cathode and a grid, said rectifying device being of a type producing an increased internal voltage drop when the grid is negative with respect to the cathode, a fixed resistor and a variable-resistance device connected in shunt across the load, and a connection between the grid and the common terminal of said fixed and variable resistors, the connections being such and said variable-resistance device being of such nature as to inherently operate to render said grid negative with respect to said cathode only whenever excessive rectified potentials are impressed upon said load.

9. In a system for supplying a unidirectional, substantially smooth voltage, the combination of a rectifying device having a cathode and an anode, a source of alternating current having a terminal connected to said anode, means for connecting the negative terminal of a direct current load to the other terminal of said source, a space-current device comprising a cathode, an anode and a control-electrode, and means for connecting the positive terminal of said direct current load to the cathode of said space-current device and for connecting the said anode of said space-current device to the cathode of said rectifier, said control electrode being maintained at substantially constant potential with respect to the negative terminal of said load, said constant potential being approximately equal to the desired value of the rectified voltage.

In testimony whereof, I have hereunto subscribed my name this 22nd day of March, 1926.

JOSEPH SLEPIAN.